April 17, 1945.                R. N. SHONER                2,374,140
                   SEAL LEAKAGE DETECTOR FOR CANNED GOODS
                          Filed July 9, 1943
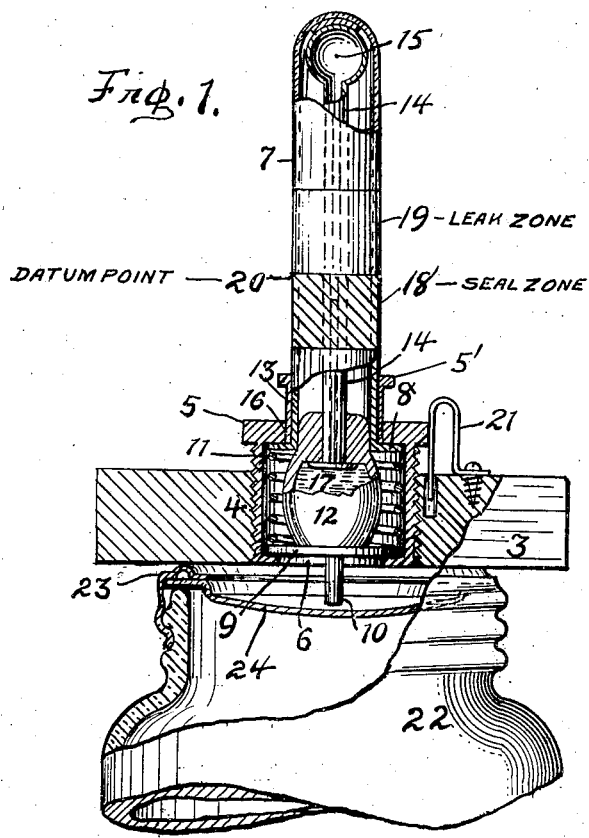
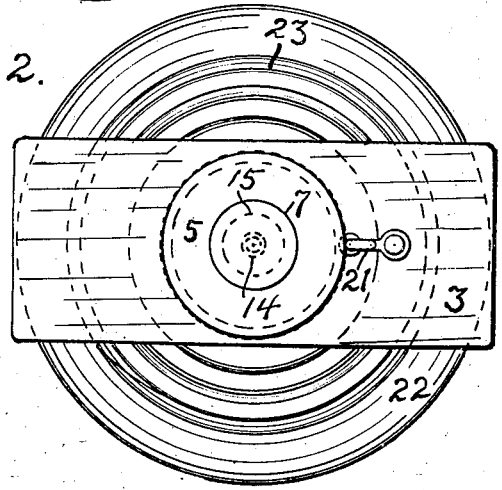
INVENTOR.
BY Robert N. Shoner
   H. G. Burns
         ATTORNEY Patented Apr. 17, 1945

2,374,140

UNITED STATES PATENT OFFICE 2,374,140

SEAL LEAKAGE DETECTOR FOR CANNED GOODS

Robert N. Shoner, Fort Wayne, Ind.

Application July 9, 1943, Serial No. 494,026

6 Claims. (Cl. 73—52)

This invention relates to improvements in seal detectors for canned goods, applicable to those types of containers that are closed and sealed by thin metallic caps provided with gutta-percha gasket linings that contact with the necks of the containers wherefore they are hermetically closed.

Ordinarily, when sealed containers of the type here referred to are filled with heated goods and the cap is applied, and upon subsequent cooling of the contents of the container, vacuum is created therein due to contraction, whereupon the cap is drawn downwardly and firmly seated in place. Normally, the sealing caps are thin and flat in their midportions and subsequently become concave to a more or less extent due to the vacuum.

An object of the instant invention is to provide an instrument that is applied to the sealing cap of a container after the container has been filled and closed by the cap, wherefore to indicate whether or not vacuum has occurred in the container after cooling and if sealing of the cap has thereby been rendered effective.

Another object of the invention is to provide a detector by which is indicated failure of the cap to become properly sealed when the container is closed thereby.

And a further object of the invention is to so construct the instrument that its indicating agent is adjustable with respect to a definitely located datum point when the instrument is placed in operative position upon the cap of a sealed container.

Other objects and advantages of the invention are shown in the accompanying drawing, in which:

Fig. 1 is a fragmentary side elevational view of a container provided with a cap and sealing ring therefor and a detector embodying the instant invention disposed upon the ceiling ring in seal-testing position, portions being broken away, and Fig. 2 is a top plan view projected from Fig. 1.

The illustrative embodiment of the invention consists of a base 3 having a centrally located threaded bore 4 having therein a threaded sleeve nut 5 that is vertically adjustable with respect to the base. The lower end of the sleeve of said nut is inturned and has a concentric aperture 6.

In connection with the sleeve nut is a transparent tubular shield 7 extending upwardly therethrough, having an external radial flange 8 on its lower end that underlies the head of the sleeve nut 5.

Within the bottom of the sleeve is disposed a contacting member having a head 9 that overlies the inturned end of the sleeve and is provided with a pendent stud 10 that projects through the aperture 5. The contacting member is held yieldingly in its lowermost position, and the shield is held in its upright position by means of a compression spring 11 that is interposed between the head of the contacting member and the flange on the shield.

Within the sleeve, surrounded by the spring 11, is disposed a liquid-containing compressible vessel 12 provided with a neck 13 that is snugly fitted into the lower end of the tubular shield, while the lower end of the vessel rests upon the upper face of the head of the contacting member 9.

In connection with the compressible vessel there is provided a capillary tube 14, the upper end of which terminates with an expansion chamber 15 that is closed to the atmosphere. The lower end of the tube has an external radial flange 16 that underlies the neck 13 of the vessel 12 and extends up through the tube into the shield where it is clearly visible.

A tubular adjuster 5' is provided that encompasses the shield and is threaded in the head of the sleeve nut 5 with its lower end contacting with the flange 8 of the shield. Thus, by turning the adjuster in the sleeve nut the shield is moved in opposition to the spring, whereupon the vessel is compressed more or less. The arrangement is such that when the vessel 12 is filled to overflowing with a liquid indicating agent 17, the level of the liquid rises or falls in the tube more or less as the vessel is compressed, and is readily discernable by the operator.

The purpose of the expansion chamber 15 is to accommodate air within the tube that becomes compressed more or less concurrently with the flood and ebb of the liquid indicating agent confined within the tube.

The liquid indicating agent 17 is of any suitable formula, preferably characterized by non-freezing properties and colored a deep shade so as to be clearly discernable when exposed to view in the capillary tube. Thus, as the vessel 12 is compressed more or less, either by turning the adjuster or by action of the contacting member, the flood and ebb of the liquid in the tube is clearly ascertained by observation of the liquid level therein.

The transparent tubular shield 7 has in its midportion adjacent colored zones 18 and 19, the lower zone preferably being shaded green and the upper zone being shaded red, their juncture establishing a datum point 20.

On the base 3 is secured a detent member 21 that exerts spring pressure against the adjacent face of the head of the sleeve nut, which preferably is knurled or notched, wherefore to yieldingly hold the nut in any desired position of adjustment.

*Operation*

In use, when the detector is applied to a container 22 of the type shown in the illustrations, the base 3 is positioned on the ceiling ring 23 that holds the cap 24 on the neck of the container so that the stud 10 is disposed in axial alinement with the cap. In the event of the seal being perfect between the cap and container, and vacuum is established within the container as usually occurs upon cooling and consequent contraction of the content of the container, the midportion of the cap is sprung downward by force of the vacuum, under which circumstance the stud 10 fails to contact the cap and remains in normal position. However, if sealing of the cap is imperfect and vacuum is not established in the container, the mid-portion of the cap then is flat and extends in a plane higher than when under influence of the vacuum, thus contacting the stud causing its elevation and consequent compression of the vessel 12 and rise of the level of the liquid indicating agent 17 in the tube 14.

Preliminary to the testing operation the adjuster 5 is turned in the sleeve nut while the base is positioned on the sealed container, thus compressing the vessel more or less and raising the liquid level of the indicating agent to a point either below or above the datum point 20 accordingly as the cap is effected by vacuum in the vessel, or not. When the liquid level is lower than the datum point, the level is viewed through the green zone which signifies that the cap is properly sealed. However, when the cap is flat and improperly sealed the contacting member is forced upward, compressing the vessel and raising the liquid level of the indicating agent beyond the datum point where it is viewed through the red zone, thus signifying that the sealing of the cap is defective.

Variations from the particular construction above disclosed may be resorted to by the exercise of skill in the art, without departure from the scope of the invention, and the following claims are intended to be inclusive of such variations.

What I claim is:

1. A leakage detector for containers that are closed and sealed by a flexible cap, consisting of a base having a central threaded bore extending therethrough, a sleeve nut vertically adjustable in said bore the lower end of which is inturned and has a concentric aperture, a contactor having a head that overlies said inturned end provided with a stud projecting through said aperture, a transparent tubular shield extending up through said sleeve nut provided with an external radial flange that underlies the head of said sleeve nut, a compressible vessel disposed within the sleeve nut seated on the head of said contactor and provided with a capillary tube extending up into said shield, a compression spring interposed between the contactor and the flange on said shield, an adjusted threaded in said sleeve nut bearing upon said flange to adjustably compress said vessel, and a detent to hold said sleeve nut in adjusted positions, said shield having in its midportion contrasting colored zones establishing a datum line therebetween wherefore to gauge the level of liquid in the capillary tube.

2. A leakage detector for containers that are closed and sealed by a flexible cap consisting of a base having a central threaded bore extending therethrough, a sleeve nut vertically adjustable in said bore the lower end of which is inturned and has a concentric aperture, a contactor having a head that overlies said inturned end provided with a stud projecting through said aperture, a transparent tubular shield extending up through said sleeve nut provided with an external radial flange that underlies the head of said sleeve nut, a compressible vessel disposed within the sleeve nut seated on the head of said contactor and provided with a capillary tube extending up into said shield, a compression spring interposed between the contactor and the flange on said shield, and a detent to hold said sleeve nut in the adjusted positions, said shield having in its midportion contrasting colored zones establishing a datum line therebetween wherefore to gauge the level of liquid in the capillary tube.

3. In a leakage detector for containers that are closed and sealed by a flexible cap, a base having a central threaded bore extending therethrough and adapted to be placed upon a container to be tested, a sleeve nut adjustably positioned in said bore, a transparent shield in connection with said nut, a contacting member in the sleeve of said nut having vertical movement therein when obstructed by said cap, a compressible vessel disposed within said nut provided with a capillary tube extending into said shield, and a liquid indicating agent in said vessel that is progressed upon compression of said vessel into said tube, said shield having contrasting colored adjacent zones between which is established a datum line, wherefore the liquid level of said agent in said tube is discernable, so that location of the liquid level in the tube is varied accordingly as the vessel is compressed by action of the contacting member.

4. A leakage detector for containers of the type having a flexible sealing cap, said detector consisting of a base applicable to the top of said container when closed, a vertically adjustable sleeve nut in said base, a transparent shield extending upwardly in connection with said nut, a compressible vessel within said nut provided with a capillary tube positioned for exposure through said shield, a liquid indicating agent in said vessel, a contactor engaging said vessel provided with a stud engaged by the cap of the container, or not, accordingly as the container is properly sealed, or not, wherefore to compress said vessel and cause displacement of said indicating agent from the vessel into said tube, said shield having a definitely located datum line thereon by which to determine the status of the liquid level in said tube.

5. A leakage detector for containers of the type having a flexible sealing cap, said detector having an apertured base applicable to the top of said container, a sleeve nut mounted adjustably in the aperture of said base, a contactor in the sleeve of said nut having movement therein limited downwardly, and provided with a stud engaged by the cap for said container, or not, accordingly as the container is properly sealed by said cap, or not, when the base is in operative position, a compressible vessel within said nut seated on said contactor and provided with a capillary tube, a liquid indicating agent contained in said vessel that rises in said tube upon compression of said vessel, and a datum line located definitely with respect to said tube wherefore to determine the status of the liquid level therein.

6. A leakage detector for containers of the type having a flexible sealing cap, said detector having an apertured base applicable to the top of said container, a compressible vessel mounted in the aperture of said base and provided with a capillary tube, a liquid indicating agent contained in said vessel that rises in said tube when the vessel is compressed, a datum line located definitely relative to said tube wherefore to determine the status of the liquid level therein, and a movable contactor mounted in connection with the base and operatively engaging said vessel, the arrangement being such that when the base is positioned on the top of the closed container the contactor engages the cap, or not, accordingly as the container is properly sealed by said cap, or not.

ROBERT N. SHONER.